(12) United States Patent
Zhao et al.

(10) Patent No.: US 9,705,130 B2
(45) Date of Patent: Jul. 11, 2017

(54) ANTIMONY-BASED ANODE ON ALUMINUM CURRENT COLLECTOR

(71) Applicant: Sharp Laboratories of America, Inc., Camas, WA (US)

(72) Inventors: Xin Zhao, Vancouver, WA (US); Sean Vail, Vancouver, WA (US); Yuhao Lu, Camas, WA (US); Motoaki Nishijima, Kita-Katsuragi-gun (JP)

(73) Assignee: Sharp Laboratories of America, Inc., Camas, WA (US)

( * ) Notice: Subject to any disclaimer, the term of this patent is extended or adjusted under 35 U.S.C. 154(b) by 3 days.

(21) Appl. No.: 14/823,399

(22) Filed: Aug. 11, 2015

(65) Prior Publication Data

US 2015/0349338 A1 Dec. 3, 2015

Related U.S. Application Data

(63) Continuation-in-part of application No. 14/795,834, filed on Jul. 9, 2015, now Pat. No. 9,431,655, which
(Continued)

(51) Int. Cl.
*H01M 4/38* (2006.01)
*H01M 4/66* (2006.01)
(Continued)

(52) U.S. Cl.
CPC ............... *H01M 4/38* (2013.01); *C01C 3/12* (2013.01); *H01M 4/0404* (2013.01);
(Continued)

(58) Field of Classification Search
CPC ...... H01M 4/38; H01M 4/662; H01M 4/0452; Y02E 60/122
(Continued)

(56) References Cited

U.S. PATENT DOCUMENTS

| 4,753,858 | A | 6/1988 | Row | |
| 2009/0117467 | A1* | 5/2009 | Zhamu | H01M 4/133 429/231.8 |

(Continued)

FOREIGN PATENT DOCUMENTS

EP 2413416 2/2012

OTHER PUBLICATIONS

A. H. Whitehead and M. Schreiber, Current Collectors for Positive Electrodes of Lithium-Based Batteries, J. Electrochem. Soc., 2005, 152, A2105-A2113.
(Continued)

*Primary Examiner* — Mark F Huff
*Assistant Examiner* — Monique Wills
(74) *Attorney, Agent, or Firm* — Law Office of Gerald Maliszewski; Gerald Maliszewski

(57) ABSTRACT

An electrochemical battery is provided with an aluminum anode current collector and an antimony (Sb)-based electrochemically active material overlying the aluminum current collector. The Sb-based electrochemically active material may be pure antimony, Sb with other metal elements, or Sb with non-metal elements. For example, the Sb-based electrochemically active material may be one of the following: Sb binary or ternary alloys of sodium, silicon, tin, germanium, bismuth, selenium, tellurium, thallium, aluminum, gold, cadmium, mercury, cesium, gallium, titanium, lead, carbon, and combinations thereof. The aluminum current collector may additionally include a material such as magnesium, iron, nickel, titanium, and combinations thereof. In one aspect, the anode further composed of a coating interposed between the aluminum current collector and the Sb-based electrochemically active material. This coating may be a non-corrodible metal or a carbonaceous material. The cathode is may be composed of a number of
(Continued)

different active materials including sodium-based Prussian Blue analogs.

12 Claims, 5 Drawing Sheets

Related U.S. Application Data is a continuation-in-part of application No. 14/668,788, filed on Mar. 25, 2015, now Pat. No. 9,531,002, which is a continuation-in-part of application No. 14/472,228, filed on Aug. 28, 2014, now Pat. No. 9,546,097, which is a continuation-in-part of application No. 14/340,141, filed on Jul. 24, 2014, which is a continuation-in-part of application No. 14/320,352, filed on Jun. 30, 2014, now Pat. No. 9,620,815, which is a continuation-in-part of application No. 14/271,498, filed on May 7, 2014, now Pat. No. 9,419,278, which is a continuation-in-part of application No. 14/230,882, filed on Mar. 31, 2014, which is a continuation-in-part of application No. 14/198,755, filed on Mar. 6, 2014, which is a continuation-in-part of application No. 14/198,702, filed on Mar. 6, 2014, now Pat. No. 9,583,751, which is a continuation-in-part of application No. 14/198,663, filed on Mar. 6, 2014, now Pat. No. 9,537,131, which is a continuation-in-part of application No. 14/193,782, filed on Feb. 28, 2014, which is a continuation-in-part of application No. 14/193,501, filed on Feb. 28, 2014, now Pat. No. 9,406,919, which is a continuation-in-part of application No. 14/174,171, filed on Feb. 6, 2014, now Pat. No. 9,455,431, which is a continuation-in-part of application No. 14/067,038, filed on Oct. 30, 2013, now Pat. No. 9,450,224, which is a continuation-in-part of application No. 14/059,599, filed on Oct. 22, 2013, now Pat. No. 9,083,041, which is a continuation-in-part of application No. 13/907,892, filed on Jun. 1, 2013, now Pat. No. 8,968,925, which is a continuation-in-part of application No. 13/897,492, filed on May 20, 2013, now Pat. No. 9,099,719, which is a continuation-in-part of application No. 13/872,673, filed on Apr. 29, 2013, now Pat. No. 9,246,164, which is a continuation-in-part of application No. 13/752,930, filed on Jan. 29, 2013, now Pat. No. 9,099,718, which is a continuation-in-part of application No. 13/603,322, filed on Sep. 4, 2012, now Pat. No. 9,159,502, and a continuation-in-part of application No. 13/523,694, filed on Jun. 14, 2012, now Pat. No. 8,956,760, which is a continuation-in-part of application No. 13/449,195, filed on Apr. 17, 2012, now Pat. No. 9,559,358, which is a continuation-in-part of application No. 13/432,993, filed on Mar. 28, 2012, now Pat. No. 9,269,953.

(51) Int. Cl.
| | |
|---|---|
| *H01M 10/054* | (2010.01) |
| *C01C 3/12* | (2006.01) |
| *H01M 4/04* | (2006.01) |
| *H01M 4/136* | (2010.01) |
| *H01M 4/1397* | (2010.01) |
| *H01M 4/485* | (2010.01) |
| *H01M 4/505* | (2010.01) |
| *H01M 4/525* | (2010.01) |
| *H01M 4/58* | (2010.01) |
| *H01M 4/587* | (2010.01) |
| *H01M 4/60* | (2006.01) |
| *H01M 4/62* | (2006.01) |
| *H01M 10/0567* | (2010.01) |
| *H01M 10/0569* | (2010.01) |
| *H01M 10/052* | (2010.01) |
| *H01M 4/02* | (2006.01) |

(52) U.S. Cl.
CPC ....... *H01M 4/0452* (2013.01); *H01M 4/0471* (2013.01); *H01M 4/136* (2013.01); *H01M 4/1397* (2013.01); *H01M 4/485* (2013.01); *H01M 4/505* (2013.01); *H01M 4/525* (2013.01); *H01M 4/58* (2013.01); *H01M 4/587* (2013.01); *H01M 4/60* (2013.01); *H01M 4/622* (2013.01); *H01M 4/625* (2013.01); *H01M 4/661* (2013.01); *H01M 4/662* (2013.01); *H01M 4/667* (2013.01); *H01M 10/054* (2013.01); *H01M 10/0567* (2013.01); *H01M 10/0569* (2013.01); *H01M 10/052* (2013.01); *H01M 2004/027* (2013.01); *H01M 2004/028* (2013.01)

(58) Field of Classification Search
USPC .................................. 429/199, 188, 213, 217
See application file for complete search history.

(56) References Cited

U.S. PATENT DOCUMENTS

| | | | | |
|---|---|---|---|---|
| 2010/0316907 | A1* | 12/2010 | Yamamoto | H01M 4/134 429/188 |
| 2010/0323235 | A1* | 12/2010 | Takami | H01M 2/027 429/158 |
| 2012/0021273 | A1 | 1/2012 | Ohmori et al. | |
| 2012/0328935 | A1* | 12/2012 | Matsui | H01M 10/0562 429/188 |
| 2012/0328941 | A1* | 12/2012 | Hosoe | H01G 9/016 429/211 |

OTHER PUBLICATIONS

A. Darwiche et al., Better Cycling Performances of Bulk Sb in Na-Ion Batteries Compared to Li-Ion Systems: An Unexpected . . . , J. Am. Chem. Soc., 2012, 134, 20805-20811.

M. He, K. Kravchyk, M. Walter and M. V. Kovalenko, Monodisperse Antimony Nanocrystals for High-Rate Li-Ion and Na-Ion Battery Anodes, Nano Lett., 2014, 14, 1255-1262.

C. W. Bale et al., FactSage Thermochemical Software and Databases—Recent Developments, Calphad, 2009, vol. 3, 295-311.

* cited by examiner

ANTIMONY-BASED ANODE ON ALUMINUM CURRENT COLLECTOR

RELATED APPLICATIONS

This application is a Continuation-in-Part of an application entitled, ANTIMONY AND LAYERED CARBON NETWORK BATTERY ANODE, invented by Xin Zhao et al, Ser. No. 14/795,834, filed Jul. 9, 2015;

which is a Continuation-in-Part of an application entitled, TRANSITION METAL CYANOMETALLATE CATHODE BATTERY WITH METAL PLATING ANODE, invented by Yuhao Lu et al, Ser. No. 14/668,788, filed Mar. 25, 2015;

which is a Continuation-in-Part of an application entitled, METHOD FOR THE SYNTHESIS OF IRON HEXACYANOFERRATE, invented by Sean Vail et al, Ser. No. 14/472,228, filed Aug. 28, 2014;

which is a Continuation-in-Part of an application entitled, TRANSITION METAL HEXACYANOMETALLATE ELECTRODE WITH WATER-SOLUBLE BINDER, invented by Long Wang et al, Ser. No. 14/340,141, filed Jul. 24, 2014;

which is a Continuation-in-Part of an application entitled, ELECTROLYTE ADDITIVES FOR TRANSITION METAL CYANOMETALLATE ELECTRODE STABILIZATION, invented by Yuhao Lu et al, Ser. No. 14/320,352, filed Jun. 30, 2014;

which is a Continuation-in-Part of an application entitled, RECHARGEABLE METAL-ION BATTERY WITH NON-AQUEOUS HYBRID ION ELECTROLYTE, invented by Long Wang et al, Ser. No. 14/271,498, filed May 7, 2014;

which is a Continuation-in-Part of an application entitled, REACTIVE SEPARATOR FOR A METAL-ION BATTERY, invented by Long Wang et al, Ser. No. 14/230,882, filed Mar. 31, 2014;

which is a Continuation-in-Part of an application entitled, NASICON-POLYMER ELECTROLYTE STRUCTURE, invented by Long Wang et al, Ser. No. 14/198,755, filed Mar. 6, 2014;

which is a Continuation-in-Part of an application entitled, BATTERY WITH AN ANODE PRELOADED WITH CONSUMABLE METALS, invented by Yuhao Lu et al, Ser. No. 14/198,702, filed Mar. 6, 2014;

which is a Continuation-in-Part of an application entitled, BATTERY ANODE WITH PRELOADED METALS, invented by Long Wang et al, Ser. No. 14/198,663, filed Mar. 6, 2014;

which is a Continuation-in-Part of an application entitled, METAL BATTERY ELECTRODE WITH PYROLYZED COATING, invented by Yuhao Lu et al, Ser. No. 14/193,782, filed Feb. 28, 2014;

which is a Continuation-in-Part of an application entitled, METAL HEXACYANOMETALLATE ELECTRODE WITH SHIELD STRUCTURE, invented by Yuhao Lu et al, Ser. No. 14/193,501, filed Feb. 28, 2014;

which is a Continuation-in-Part of an application entitled, CYANOMETALLATE CATHODE BATTERY AND METHOD FOR FABRICATION, invented by Yuhao Lu et al, Ser. No. 14/174,171, filed Feb. 6, 2014;

This application is a Continuation-in-Part of an application entitled, SODIUM IRON(II)-HEXACYANOFERRATE(II) BATTERY ELECTRODE AND SYNTHESIS METHOD, invented by Yuhao Lu et al, Ser. No. 14/067,038, filed Oct. 30, 2013;

which is a Continuation-in-Part of an application entitled, TRANSITION METAL HEXACYANOMETALLATE-CONDUCTIVE POLYMER COMPOSITE, invented by Sean Vail et al., Ser. No. 14/059,599, filed Oct. 22, 2013, now U.S. Pat. No. 9,083,041, issued on Jul. 14, 2015;

which is a Continuation-in-Part of an application entitled, METAL-DOPED TRANSITION METAL HEXACYANOFERRATE (TMHCF) BATTERY ELECTRODE, invented by Yuhao Lu et al., Ser. No. 13/907,892, filed Jun. 1, 2013, now U.S. Pat. No. 8,968,925, issued on Mar. 3, 2015;

which is a Continuation-in-Part of an application entitled, HEXACYANOFERRATE BATTERY ELECTRODE MODIFIED WITH FERROCYANIDES OR FERRICYANIDES, invented by Yuhao Lu et al., Ser. No. 13/897,492, filed May 20, 2013;

which is a Continuation-in-Part of an application entitled, PROTECTED TRANSITION METAL HEXACYANOFERRATE BATTERY ELECTRODE, invented by Yuhao Lu et al., Ser. No. 13/872,673, filed Apr. 29, 2013;

which is a Continuation-in-Part of an application entitled, TRANSITION METAL HEXACYANOFERRATE BATTERY CATHODE WITH SINGLE PLATEAU CHARGE/DISCHARGE CURVE, invented by Yuhao Lu et al., Ser. No. 13/752,930, filed Jan. 29, 2013;

which is a Continuation-in-Part of an application entitled, SUPERCAPACITOR WITH HEXACYANOMETALLATE CATHODE, ACTIVATED CARBON ANODE, AND AQUEOUS ELECTROLYTE, invented by Yuhao Lu et al., Ser. No. 13/603,322, filed Sep. 4, 2012.

Ser. No. 13/752,930 is also a Continuation-in-Part of an application entitled, IMPROVEMENT OF ELECTRON TRANSPORT IN HEXACYANOMETALLATE ELECTRODE FOR ELECTROCHEMICAL APPLICATIONS, invented by Yuhao Lu et al., Ser. No. 13/523,694, filed Jun. 14, 2012;

which is a Continuation-in-Part of an application entitled, ALKALI AND ALKALINE-EARTH ION BATTERIES WITH HEXACYANOMETALLATE CATHODE AND NON-METAL ANODE, invented by Yuhao Lu et al., Ser. No. 13/449,195, filed Apr. 17, 2012;

which is a Continuation-in-Part of an application entitled, ELECTRODE FORMING PROCESS FOR METAL-ION BATTERY WITH HEXACYANOMETALLATE ELECTRODE, invented by Yuhao Lu et al., Ser. No. 13/432,993, filed Mar. 28, 2012. All these applications are incorporated herein by reference.

This invention was made with Government support under DE-AR0000297 awarded by DOE. The Government has certain rights in this invention.

BACKGROUND OF THE INVENTION

1. Field of the Invention

This invention generally relates to electrochemical batteries and, more particularly, to a battery anode comprised of antimony (Sb) electrochemically active materials on an aluminum current collector.

2. Description of the Related Art

Rechargeable batteries are known to include at least one positive current collector and at least one negative current collector to support electrode materials that, once immersed in an electrolyte, participate in the electrochemical charge storage reactions. The charge storage occurs as a result of faradaic reactions at both the anode and cathode. Conventionally, both the positive and negative current collectors in a lithium-ion or sodium-ion battery are configured as flat metal foils or plates, referred to as current collectors [1]. The electrode materials are usually physically deposited on these current collectors. The current collectors collect the charges generated during discharging processes, and to permit the connection of the electrodes to an external power source during recharge. The charge transfer reactions and electrolyte decomposition in the proximity of the current collectors usually result in corrosion behavior at the metallic surface of the current collectors during cycling. Specifically, on the negative electrode side, Li-ion or Na-ion intercalation can occur, i.e., metallic alloys are formed upon taking the Li or Na ions [2]. Internal mechanical stress is therefore built up on the current collectors, which deforms and stretches the metal foils or plates. This stress is followed by pulverization of the current collectors and dissolution of the exposed current collector surface, which leads to an entire cell failure due to a drastic rise of internal resistance, rapid degradation of cell performance, and even internal shorting within current collectors and rapture of cell case.

To suppress such corrosion behavior and potential hazards, the choice of current collectors in Li-ion battery configurations is limited to copper (Cu) on the negative (anode) side and aluminum (Al) on the positive (cathode) side in non-aqueous electrolytes. High-quality metal foils and plates are required, and other less costly but corrodible metal species are preferably avoided. To further achieve a high power density and longer battery life, there have been attempts to treat the current collectors to diminish corrosion, for instance, by introducing non-corrodible metal or carbon coatings onto current collectors. However, substantial quantities of noble metals such as platinum, gold, or silver are needed in this scheme to ensure long-term robustness, which leads to significant increases in the material and manufacturing cost, and complexity in the final battery cells.

Conventionally, Cu has represented the only economically viable and practical solution as a negative electrode current collector in Li-ion and Na-ion batteries. However, care must be taken to prevent over-discharging the battery cells, which is a condition that results in Cu current collector degradation. In addition, certain types of active materials and electrolyte additives have a deleterious effect on Cu current collectors. For example, intermetallic alloy-based active materials (e.g., antimony) and alkaline salts (e.g., caesium salts) may alloy with Cu electrochemically.

Previously disclosed is a Na-ion battery design consisting of an Al current collector with carbonaceous anode materials [3,4]. However, an Al anode structure incorporating carbonaceous material is not capable of handling high current density when used with a non-aqueous electrolyte, which compromises the rate capability and power output of the battery device.

It would be advantageous if an anode could be fabricated with an Al current collector, capable of long life and high current densities, for use in a non-aqueous electrolyte battery.

1) T. R. Jow, Rechargeable Sodium Alloy Anode, U.S. Pat. No. 4,753,858.
2) A. H. Whitehead and M. Schreiber, Current Collectors for Positive Electrodes of Lithium-Based Batteries, *J. Electrochem. Soc.*, 2005, 152, A2105-A2113.
3) S. Ohmori and T. Yamamoto, Sodium Ion Battery, US 2012/0021273A1.
4) S. Ohmori and T. Yamamoto, Sodium Ion Battery, EP 2413416A1.
5) A. Darwiche, C. Marino, M. T. Sougrati, B. Fraisse, L. Stievano and L. Monconduit, Better Cycling Performances of Bulk Sb in Na-Ion Batteries Compared to Li-Ion Systems: An Unexpected Electrochemical Mechanism, *J. Am. Chem. Soc.*, 2012, 134, 20805-20811.
6) M. He, K. Kravchyk, M. Walter and M. V. Kovalenko, Monodisperse Antimony Nanocrystals for High-Rate Li-Ion and Na-Ion Battery Anodes, *Nano Lett.*, 2014, 14, 1255-1262.
7) C. W. Bale, E. BBelisle, P. Chartrand, S. A. Decterov, G. Eriksson, K. Hack, I. H. Jung, Y. B. Kang, J. Melancon, A. D. Pelton, C. Robelin, and S. Petersen, FactSage Thermochemical Software and Databases—Recent Developments, Calphad, 2009, vol. 3, 295-311, (http://www.crct.polymtl.ca/fact/documentation/SGTE/SGTE_Figs.htm).

SUMMARY OF THE INVENTION

Disclosed herein is an approach to constructing a high-performance anode for rechargeable batteries that comprises antimony (Sb) or an antimony composite deposited on an aluminum (Al) current collector. For example, the rechargeable batteries may be sodium-ion batteries. The anode electrochemically active material contains either a single component of antimony, or one or multiple compounds consisting of antimony. The other component or components in combination with Sb can be either metallic or non-metallic. For example, the electrochemically active material can be antimony binary or ternary alloys of sodium, silicon, tin, germanium, bismuth, selenium, tellurium, and lead, or else Sb and carbon composites or mixtures. These materials can be tailored with Sb content to provide active sites for Na-ion accommodation for high discharge capacities [5, 6]. The current collector is mainly composed of Al, which is essentially an Al foil, plate, mesh, foam, or grid, etc. The current collector can also be an aluminum alloy containing magnesium, iron, nickel, or titanium, etc. The current collector can be partially coated or entirely coated with a non-corrodible metal or carbon material as a protective layer.

The electrode architecture offers a combination of several advantageous features, as follows:

(1) The use of aluminum as a negative (anode) current collector offers an attractive pathway to reduce the total cost and weight of Na-ion batteries;

(2) The use of an Al current collector inhibits any potential hazards caused by over-discharging a copper current collector, that is used as negative current collector in conventional batteries;

(3) The use of an Al current collector eliminates any possible side reactions between Cu and active materials, for instance electrochemical alloying with metallic species, e.g., antimony, in active materials;

(4) The use of an Al current collector enables the application of electrolyte additives, e.g., alkaline salts, that can react with copper in conventional batteries;

(5) The adhesion between active materials and current collector is largely improved, and additional coatings such as carbon can be introduced onto an Al current collector to further improve the compatibility of active materials with the current collector;

(6) Sb-based anode electrochemically active materials provide excellent energy and power density, and in combination with an Al current collector, lead to robust cycling behavior in high-performance Na-ion batteries;

(7) A rechargeable Na-ion battery with a superior rate capability is enabled, as described in detail below, which couples a Sb-based anode with a transition metal hexacyanometallate cathode, both supported on Al current collectors, and functioning in a non-aqueous electrolyte. The high-rate capability of a transition metal hexacyanometallate cathode and Sb-based anode yields a battery configuration with extremely high power output.

Accordingly, an electrochemical battery is provided with an aluminum anode current collector. The battery components are: a cathode, a non-aqueous electrolyte, and an anode. The anode components are an aluminum current collector, and an Sb-based electrochemically active material overlying the aluminum current collector. The non-aqueous electrolyte may be primarily composed of one or more carbonates, in combination with a dissolved sodium salt, as described in detail below. Alternatively, the non-aqueous electrolyte may be primarily composed of a polymer host, in combination with a dissolved sodium salt. The non-aqueous electrolyte may also include an additive such as fluorinated cyclic carbonates, fluorinated linear carbonates, or alkaline salts.

The cathode is primarily composed of an electrochemically active material such as sodium cobalt oxide ($NaCoO_2$), sodium manganese(IV) oxide ($NaMnO_2$), sodium nickel(II) oxide ($NaNiO_2$), sodium iron(III) phosphate ($NaFePO_4$), manganese(IV) oxide ($MnO_2$), vanadium(V) oxide ($V_2O_5$), molybdenum trioxide ($MoO_3$), Prussian Blue analogues, sulfur, or active organics including electrically conducting polymers and oxocarbon salts. As used herein, "primarily" means more than 50% by weight. The Sb-based electrochemically active material may be pure antimony, Sb with other metal elements, or Sb with non-metal elements. For example, the Sb-based electrochemically active material may be one of the following: Sb binary or ternary alloys of sodium, silicon, tin, germanium, bismuth, selenium, tellurium, thallium, aluminum, gold, cadmium, mercury, cesium, gallium, titanium, lead, carbon, and combinations thereof. The aluminum current collector may additionally include a material such as magnesium, iron, nickel, titanium, and combinations thereof. In one aspect, the anode is further composed of a coating interposed between the aluminum current collector and the Sb-based electrochemically active material. This coating may be a non-corrodible metal or a carbonaceous material.

Additional details of the above-described battery and an Sb-based anode using an Al current collector are provided below.

DETAILED DESCRIPTION

Figure 1:
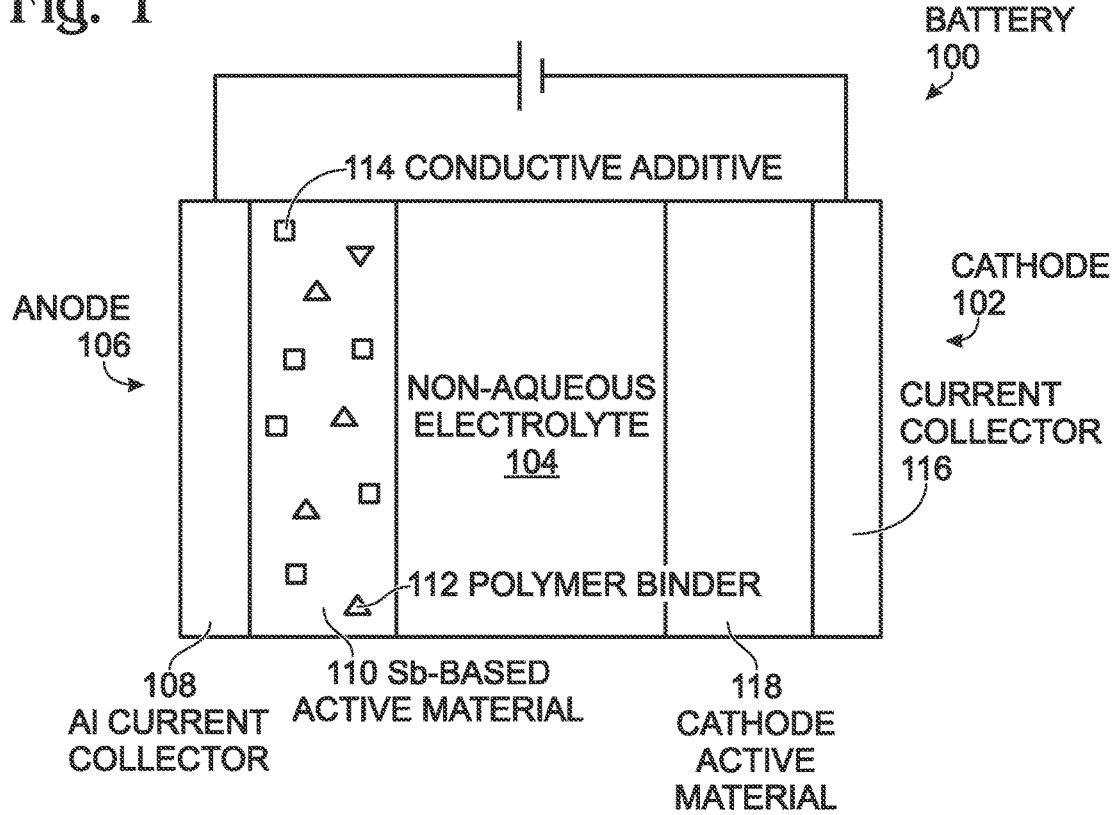
FIG. 1 is a partial cross-sectional view of an electrochemical battery with an aluminum anode current collector.

FIG. 1 is a partial cross-sectional view of an electrochemical battery with an aluminum anode current collector. The battery 100 comprises a cathode 102, a non-aqueous electrolyte 104, and an anode 106. In some aspects, for example when a liquid electrolyte is used, an ion-permeable separator (not shown) may be interposed between the anode and cathode. The anode 106 comprises an aluminum current collector 108 and an antimony (Sb)-based electrochemically active material 110 overlying the aluminum current collector. The Al current collector 108 has a structure that may be in the form of a foil, plate, mesh, foam, or grid.

The non-aqueous electrolyte 104 primarily comprises one or more of the following carbonates: ethylene carbonate, propylene carbonate, dimethyl carbonate, diethyl carbonate, and ethyl methyl carbonate, in combination with a dissolved sodium (Na) salt. Some examples of enabling sodium salts include sodium hexafluorophosphate ($NaPF_6$), sodium perchlorate ($NaClO_4$), sodium bis(trifluoromethane)sulfonamide (NaTFSI), sodium aluminate ($NaAlO_2$) and sodium tetrafluoroborate ($NaBF_4$).

Alternatively, the non-aqueous electrolyte 104 is primarily comprised of one of the following polymer hosts: polyvinylidene fluoride (PVDF), poly(vinylidene fluoride-co-hexafluoropropylene)/poly(methyl methacrylate) (PVDF-HFP), polyethylene oxide (PEO) [also known as polyethylene glycol (PEG)], polyacrylonitrile (PAN), poly(methyl methacrylate) (PMMA), or ionic liquids, in combination with a dissolved sodium salt. Again, some examples of enabling sodium salts include $NaPF_6$, $NaClO_4$, NaTFSI, $NaAlO_2$, and $NaBF_4$. The non-aqueous electrolyte 104 may further comprise an additive such as fluorinated cyclic carbonates, fluorinated linear carbonates, or alkaline salts.

The cathode 102 comprises a current collector 116 and primarily comprises one or more of the following electrochemically active materials 118: sodium cobalt oxide ($NaCoO_2$), sodium manganese(IV) oxide ($NaMnO_2$), sodium nickel(II) oxide ($NaNiO_2$), sodium iron(III) phosphate ($NaFePO_4$), manganese(IV) oxide ($MnO_2$), vanadium(V) oxide ($V_2O_5$), molybdenum trioxide ($MoO_3$), Prussian Blue analogues (PBAs), sulfur, or active organics including electrically conducting polymers and oxocarbon salts.

In one aspect, The PBAs are a hexacyanometallate having the chemical formula of $A_xM1_mM2_n(CN)_z \cdot d[H_2O]_{ZEO} \cdot e[H_2O]_{BND}$, with the following conditions:

A is a metal from Groups 1A, 2A, or 3A of the Periodic Table;

M1 and M2 are metals consisting of 2+ and 3+ valance positions;

$[H_2O]_{ZEO}$ represents zeolite (interstitial) water molecules;

$[H_2O]_{BND}$ represents lattice-bound water molecules;

x is in the range of 0.5 to 2;

M is in the range of 0.5 to 1.5;

N is in the range of 0.5 to 1.5; and,

Z is in a range of 5 to 6.

Although the value of d may theoretically be zero, the Applicant is unaware of any conventional or prior art processes capable of achieving this value. High temperature processes proprietary to the Applicant, however, do permit the value of d to be 0. The value of e is in the range of greater than 0 and less than 8. Although the value of e may theoretically be zero, the Applicant is unaware of any conventional or prior art processes capable of achieving this value. Processes proprietary to the Applicant permit the value of e to approach zero, although the actual value of zero may be unachievable, or at least impractical.

The Sb-based electrochemically active material 110 comprises pure antimony, Sb with other metal elements, or Sb with non-metal elements. An "electrochemically active material" is defined herein as electrode constituents that participate in the electrochemical reactions that occur during charge and discharge cycling. More explicitly, the Sb-based electrochemically active material active 110 may be Sb binary or ternary alloys of sodium, potassium, silicon, tin, germanium, bismuth, selenium, tellurium, thallium, aluminum, gold, cadmium, arsenic, mercury, cesium, gallium, titanium, lead, carbon, and combinations thereof. The Sb-based electrochemically active material 110 can be composites or mixtures of Sb or Sb alloys with carbon such as graphite, hard carbon and amorphous carbon, sulfur, phosphor, metal oxides such as tin oxide, germanium oxide, iron oxide and manganese oxide, or metal sulfides such as tin sulfide, iron sulfide, titanium sulfide, and molybdenum sulfide, etc. The aluminum current collector 108 may additionally comprises a material such as magnesium, iron, nickel, titanium, and combinations thereof.

Optionally, the anode 106 may further comprise a polymer binder 112. In another aspect, the anode may further comprise a conductive additive 114, which may for example be carbon black, graphite, graphene, carbon nanotubes (CNTs), or carbon nanofibers (CNFs).

Figure 2:
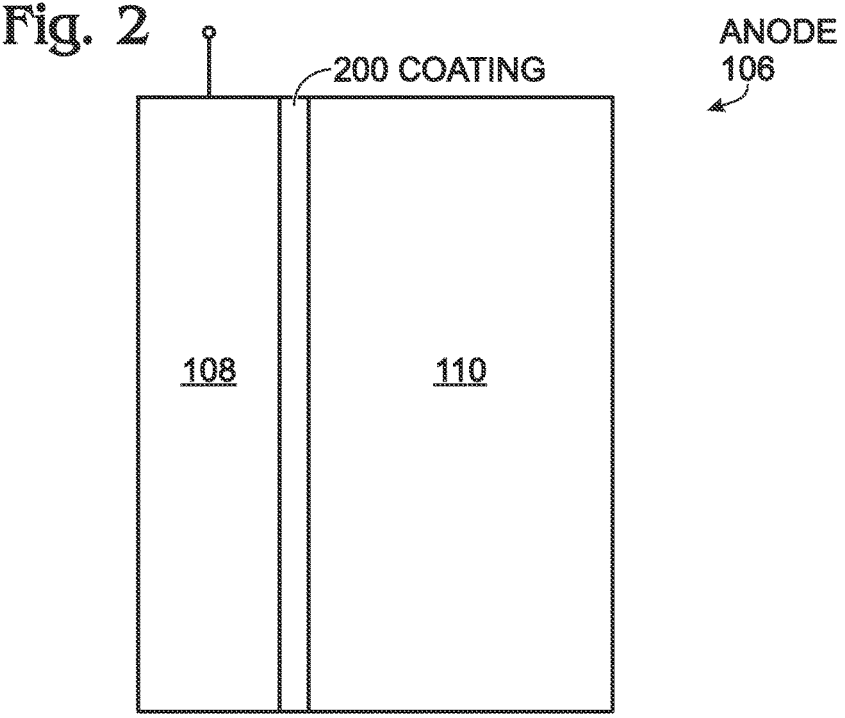
FIG. 2 is a partial cross-sectional view depicting a variation of the anode.

FIG. 2 is a partial cross-sectional view depicting a variation of the anode. The anode 106 may optionally further comprise a coating 200 interposed between the aluminum current collector 108 and the Sb-based electrochemically active material 110. The coating 200 may be comprised of a non-corrodible metal or a carbonaceous material. A "non-corrodible metal" refers to a metal is not oxidized by strong acid or other possible oxidants that may be found in a battery. The non-corrodible metal is typically a noble metal or noble metal mixture belonging to the platinum group, such as platinum, iridium, rhodium, rhodium, palladium, osmium, or a metal or metal mixture already treated to form a non-corrodible passive surface film, such as stainless steel.

As noted above, the essential electrochemically active component of the anode 106 is Sb, which can be pure Sb, or one of multiple compounds consisting of antinomy. The other component or components in combination with Sb can be either metallic or non-metallic. For example, the electrochemically active material can be binary, ternary alloys or can contain more than three metallic components such as sodium, potassium, silicon, tin, germanium, lead, bismuth, selenium, tellurium, thallium, aluminum, gold, cadmium, arsenic, mercury, cesium, gallium, titanium, and the like. In another case, the electrochemically active material can be composites or mixtures of Sb or Sb alloys with carbon such as graphite, hard carbon and amorphous carbon, sulfur, phosphor, metal oxides such as tin oxide, germanium oxide, iron oxide and manganese oxide, or metal sulfides such as tin sulfide, iron sulfide, titanium sulfide, and molybdenum sulfide, etc.

The current collector 108 is mainly composed of Al, which is essentially an Al foil, plate, mesh, foam, or grid, etc. It can also be one or multiple aluminum alloys containing magnesium, iron, nickel and titanium, etc. The current collector can be partially coated and entirely coated with non-corrodible metal or carbon materials as protective layers.

The fabrication of the Sb-based anode 106 is not critical and can vary broadly. Conventional coating procedures are readily adaptable for use. For example, the electrochemically active materials, i.e., Sb or Sb-containing compounds, are deposited onto the Al current collector by tape casting, spin coating, dip coating, or lamination, etc., and if necessary, an addition of polymer binder 112 and/or conductive additive 114 is applied with the active material (see FIG. 1). The binders include at least one of poly(vinylidene fluoride) (PVDF), copolymers of PVDF e.g. poly(vinylidene fluoride-co-hexa fluoropropylene) (PVDF-HFP), PVC, PVA, polyethylene (PE), polypropylene (PP), ethylene vinyl acetate, and celluloses e.g. methyl cellulose, carboxymethyl cellulose, ethyl cellulose, butyl cellulose, cellulose acetate, and cellulose nitrate. The conductive additives include at least one of carbon black, graphite, graphene, carbon nanotubes (CNTs), or carbon nanofibers (CNFs).

The anode 106 can also be fabricated by depositing Sb or Sb-containing compounds onto the Al current collector chemically by chemical vapor deposition (CVD) or sputtering in an inert atmosphere. The active material 110 is more compatible with Al than with Cu, and anode films exhibit improved adhesion to the current collector and thus enhanced mechanical integrity, particularly for thick anode films with a high areal mass loading. A layer 200 (see FIG. 2) of non-corrodible metal or carbon materials can be deposited onto the surface of Al via similar approaches prior to the deposition of anode materials, which increases the surface roughness of current collector, and improves the adhesion of anode films to current collector even further.

Figure 3A:
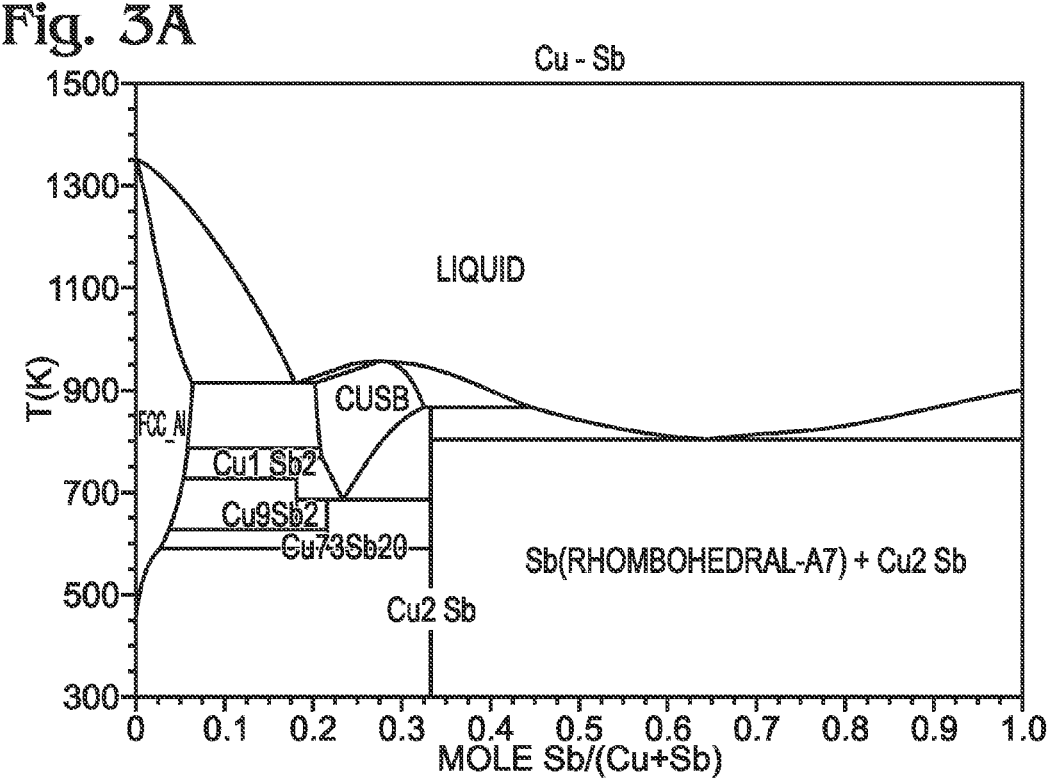
FIGS. 3A and 3B are binary phase diagrams associated, respectively, with Cu—Sb and Al—Sb systems.
Figure 3B:
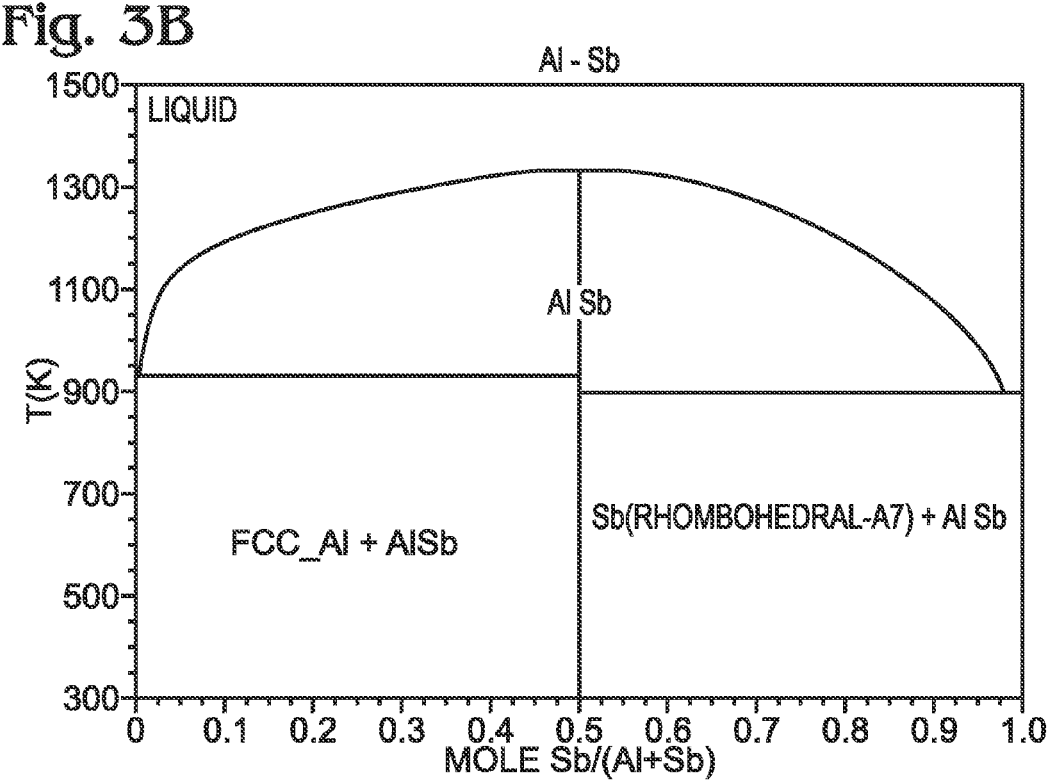

FIGS. 3A and 3B are binary phase diagrams associated, respectively, with Cu—Sb and Al—Sb systems. Cu forms multiple binary alloys with Sb, e.g., $Cu_2Sb$, $Cu_{73}Sb_{20}$, $Cu_9Sb_2$, and $Cu_{11}Sb_2$, while the alloying between Al and Sb is thermodynamically less favorable, with only one alloy phase AlSb in the high temperature region. Therefore, a reaction between Al and Sb is less likely to occur than a reaction between Cu and Sb. These phase diagrams demonstrate a more stable interphase between the Sb active materials and an Al current collector, and consequently an improved cycling life of the anode.

As noted above, the electrolyte is a non-aqueous solution containing one or a few types of carbonates, including ethylene carbonate (EC), propylene carbonate (PC), dimethyl carbonate (DMC) and diethyl carbonate (DEC), etc., and a sodium salt e.g. $NaPF_6$, $NaClO_4$, NaTFSI, $NaAlO_2$, and $NaBF_4$. Alternatively, the electrolyte can be a gel or solid film, which also acts as a separator. It may consist of a polymer host, e.g., PVDF, PVDF-HFP, PEO, PAN, and PMMA or an ionic liquid such as $PYR_{14}FSI$, [BMIM]Cl and [EMIM]Cl, a sodium salt, and an optional plasticizer, e.g., inorganic nanoparticles ($SiO_2$, $Al_2O_3$, and MgO, etc.). EC and PC strengthen the ionic conductivity. Electrolyte additives such as fluorinated cyclic and linear carbonate compounds, e.g., fluoroethylene carbonate (FEC), along with inorganic salts containing alkaline cations, e.g., lithium fluoride (LiF), can be incorporated into the multi-component electrolytes to provide additional anodic stability.

EXAMPLE

In one example, a Sb composite anode was fabricated by pasting a mixture of Sb submicron-sized particles (Strem Chemicals Inc.), carbon (Nippon Graphite Fiber Corporation, Japan), and sodium alginate (MP Biomedicals) binder onto Al foil current collector. The mass ratio of Sb and carbon can vary from about 1/10 to about 10/1.

To characterize the anode properties, half-cell charge/discharge tests were performed using a CR2032-type coin cell. Metallic sodium was used as the counter electrode. The typical mass loading level of anode coating was about ~2-5 mg per $cm^2$ area of the electrode. The anode was dried at 120° C. for 12 hours under vacuum before being assembled into a coin cell in an argon (Ar)-filled glovebox. The electrolyte solution was 1 M NaPF$_6$/ethylene carbonate (EC)/diethyl carbonate (DEC) (1:1 by volume) (BASF). A microporous glass-fiber membrane (Whatman) was used as the separator.

Figure 4:
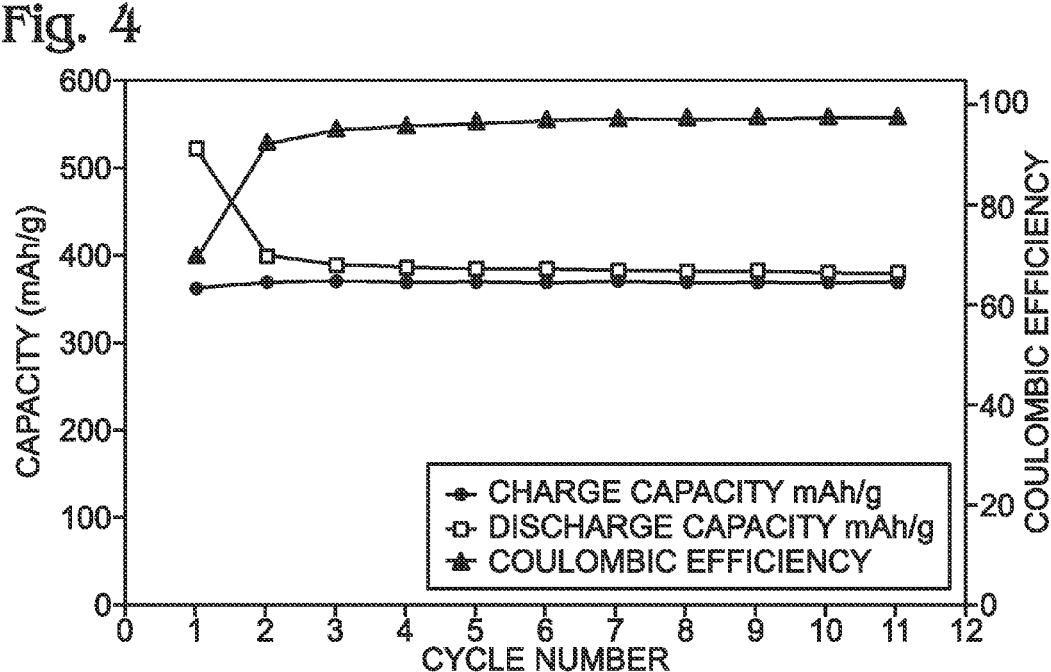
FIG. 4 is a graph depicting the specific capacity and coulombic efficiency of a Sb composite anode supported on Al current collector.

FIG. 4 is a graph depicting the specific capacity and coulombic efficiency of a Sb composite anode supported on Al current collector. The anode films were charged and discharged at a constant rate of 30 milliamp hours per gram (mAh/g) (0.1 C). With a Sb-to-carbon ratio of ~1:1, the composite anode attained a reversible capacity of approximately 380-400 milliamp hours per gram (mAh/g) based on the total mass of Sb and carbon, when tested at a constant current density of 0.03 A/g (0.1 C). The coulombic efficiency was typically above 70% in the first cycle, and increased to beyond 97% after five cycles.

Figure 5:
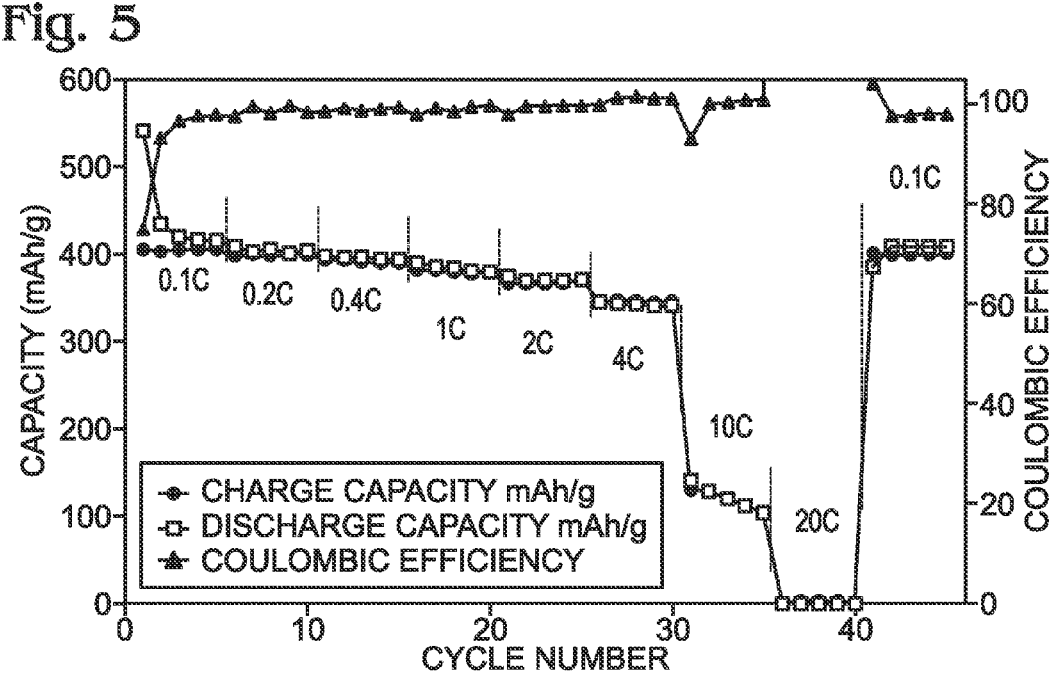
FIG. 5 is a graph depicting the specific capacity and coulombic efficiency of a Sb composite anode supported on Al current collector at various charge and discharge rates.

FIG. 5 is a graph depicting the specific capacity and coulombic efficiency of a Sb composite anode supported on Al current collector at various charge and discharge rates. The anode films were charged/discharged at 30 mA/g (5 cycles)→60 mA/g (5 cycles)→120 mA/g (5 cycles)→300 mA/g (5 cycles)→600 mA/g (5 cycles)→1200 mA/g (5 cycles)→3000 mA/g (5 cycles)→6000 mA/g (5 cycles). When cycled at a current density of 0.3 A/g (1 C), the electrode retained a reversible capacity of 350-370 mAh/g. After 3 cycles at 0.3 A/g, the coulombic efficiency stabilized at ~99.6%, and ~94% of capacity was maintained after 100 cycles.

Figure 6:
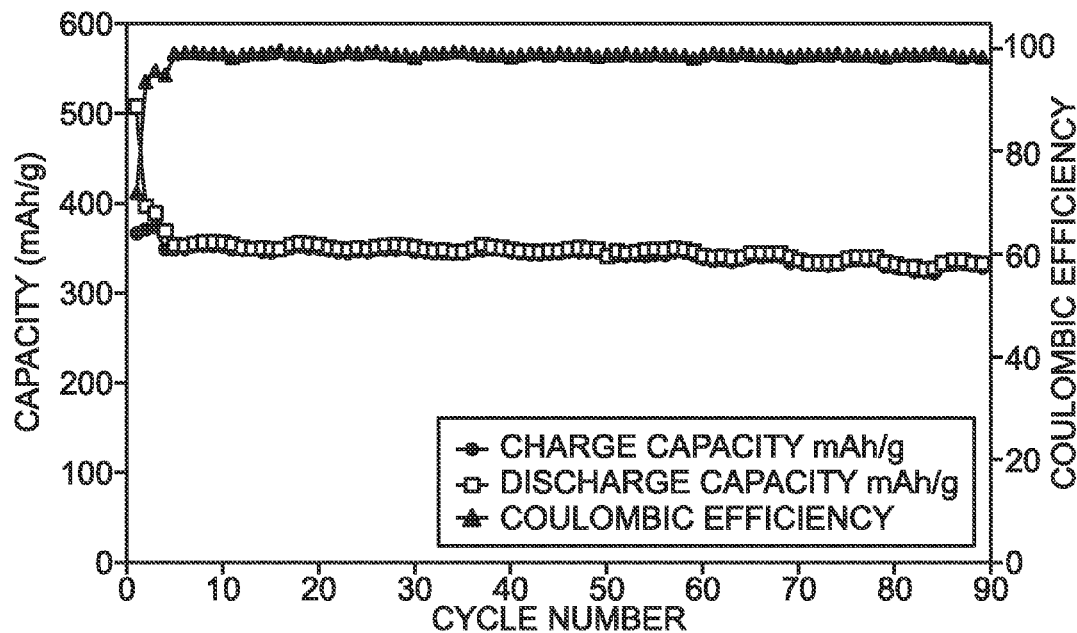
FIG. 6 is a graph depicting the capacity retention and coulombic efficiency of a Sb composite anode supported on Al current collector.

FIG. 6 is a graph depicting the capacity retention and coulombic efficiency of a Sb composite anode supported on Al current collector. The anode films were charged and discharged at a constant rate of 0.3 A/g (1 C). The excellent rate capability of the electrode was evidenced by inserting-extracting Na-ion into the Sb composite at very high velocities. In a symmetric rate test during which the electrode was charged/discharged at various rates from 0.03 A/g (0.1 C) up to 6 A/g (20 C), the electrode displayed a high capacity retention, e.g. a reversible capacity of ~360 mAh/g at 0.3 A/g and ~130 mA/g at 3 A/g (10 C), respectively. Upon returning the rate back to 0.03 A/g, the initial capacity was recovered.

To assemble a full cell, a polypropylene separator was placed on the Sb composite anode, and a cathode of sodium transition metal hexacyanometallate (NaMFe(CN)$_6$ with M=Mn) was stacked on top. The cathode contained a mixture of active material, conductive carbon, and PVDF polymer binder in the mass ratio of 80:12:8 deposited on an Al foil current collector. The full cell was sealed inside an aluminum laminated pouch with metal current collectors extending out. The electrolyte solution, containing 1 M NaPF$_6$/ethylene carbonate (EC)/dimethyl carbonate (DMC) (1:1 by volume), was injected into the pouch before sealing.

Figure 7:
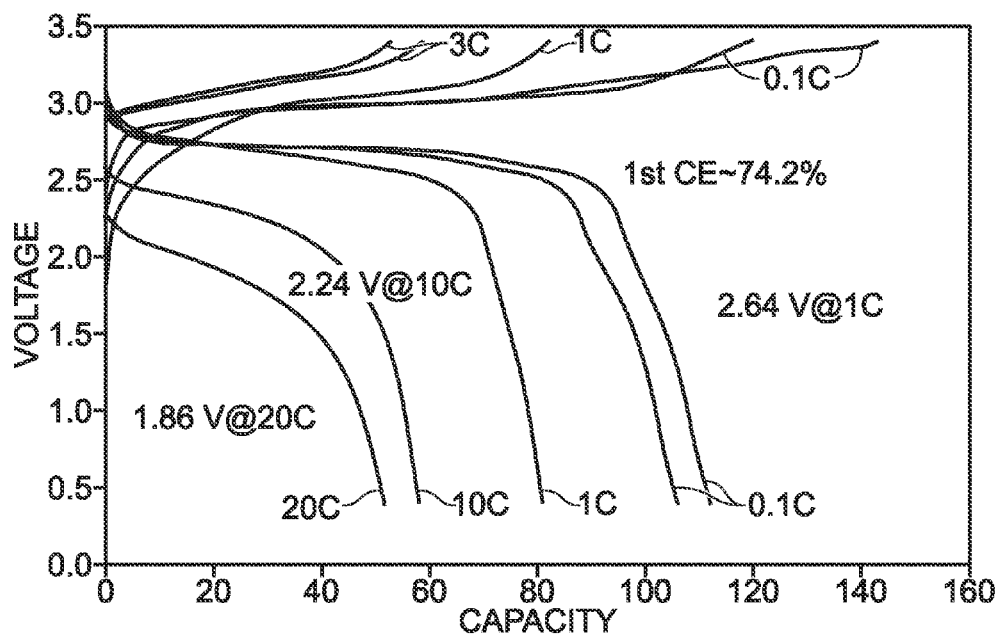
FIG. 7 is a graph depicting charge and discharge curves of a full cell coupling a $Na_2MnFe(CN)_6$ cathode to a Sb composite anode supported on Al current collector.

FIG. 7 is a graph depicting charge and discharge curves of a full cell coupling a Na$_2$MnFe(CN)$_6$ cathode to a Sb composite anode supported on Al current collector. The cell was charged at 0.1 C for the first to third cycles, and 1 C for the fourth to sixth cycles, and then at 3 C for the following cycles. The discharge protocol was 0.1 C (3 cycles)→1 C (3 cycles)→10 C (3 cycles)→20 C (3 cycles)→3 C (following cycles).

Figure 8:
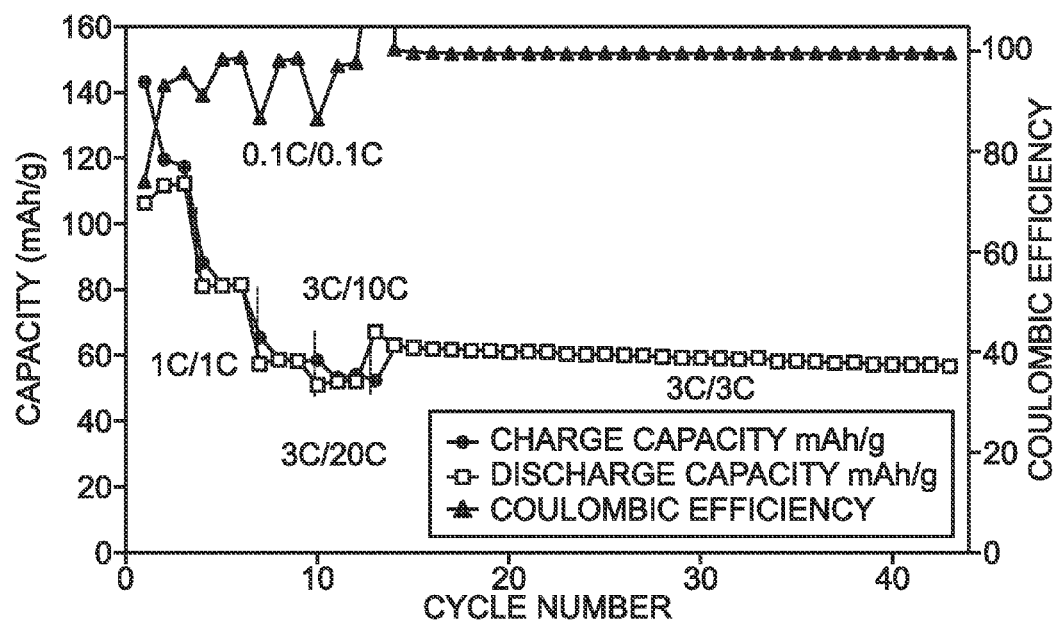
FIG. 8 is a graph depicting the capacity retention and coulombic efficiency of a full cell coupling a $Na_2MnFe(CN)_6$ cathode and a Sb composite anode supported on Al current collector.

FIG. 8 is a graph depicting the capacity retention and coulombic efficiency of a full cell coupling a Na$_2$MnFe(CN)$_6$ cathode and a Sb composite anode supported on Al current collector. The cell was charged at 0.1 C for the first to third cycles and 1 C for the fourth to sixth cycles, and then at 3 C for the following cycles. The discharge protocol was 0.1 C (3 cycles)→1 C (3 cycles)→10 C (3 cycles)→20 C (3 cycles)→3 C (following cycles). The full cell was first cycled between 0.4 and 3.4 V at a charge/discharge rate of 0.1 C and 1 C to activate the Sb component, and a high initial coulombic efficiency of 74-76% was obtained. At the 0.1 C-rate, the cell showed a discharge voltage plateau at 2.70 V, which dropped slightly to 2.64 V at 1 C-rate. In the subsequent cycles, the cell was charged at a constant rate of 3 C, and discharged at 10 C and 20 C-rate. Correspondingly, a single discharge cycle took approximately 3 min or 1 min at 10 C or 20 C, and the cell was recharged within 8 min under this test protocol. Around 75% and 65% of the discharge capacity at the 1 C-rate was retained at 10 C and 20 C, respectively. The discharge voltage was 2.24 V and 1.86 V at 10 C and 20 C, respectively. These values imply a cell structure with a very high rate capability and minimal polarization, which potentially outperforms any established Na-ion cell configurations. Upon switching the discharge rate to 3 C, the cell was cycled with 50% of the initial capacity and a high coulombic efficiency of 99.7%.

In summary, the anode architecture disclosed herein enables the use of Al as current collector to replace the conventional copper current collectors, and so offers an attractive pathway to substantially reduce the total cost and weight of Na-ion batteries. The anode architecture eliminates the corrosion behavior and battery failure associated with use of non-noble or non-precious metal current collectors, which inevitably occurs in conventional batteries. The use of an Al current collector inhibits potential hazards caused by battery over-discharging. The use of an Al current collector eliminates the side reactions that may occur between Cu and active materials, for instance, electrochemical alloying with a metallic species, such as antimony, in an active material. The use of an Al current collector enables the use of electrolyte additives, such as alkaline salts, that can react with Cu in conventional batteries. The use of an Al current collector improves the adhesion between active materials and the current collector, and thus, the mechanical integrity of the anode films. Additional coatings such as carbon can be introduced onto Al current collector to further improve the compatibility of active materials with the current collector. The anode system provides excellent energy and power density, as well as robust cycling behavior for constructing high-performance Na-ion batteries. As an enabled example, a rechargeable Na-ion battery with superior rate capability has been disclosed, which couples a Sb-based anode with a transition metal hexacyanometallate cathode, both supported on Al current collectors and immersed in a non-aqueous electrolyte. The high-rate capability of the transition metal hexacyanometallate cathode and the Sb-based anode yields a battery configuration with an extremely high power output. The high-rate capability of the transition metal hexacyanometallate cathode and the Sb-based anode yields a battery configuration with an extremely high power output.

An anode has been provided comprising a Sb-based active material formed on an Al current collector. Examples of particular materials and process details have been presented to illustrate the invention. However, the invention is not limited to merely these examples. Although cathode sodium-ion intercalation materials were presented in many of the examples, it should be understood that the invention is applicable to other metals and other alkali and alkaline earth metal Prussian Blue analogue cathode materials. Other variations and embodiments of the invention will occur to those skilled in the art.

We claim:

1. An electrochemical battery with an aluminum anode current collector, the battery comprising:
   a cathode including a sodium-ion active material;
   a non-aqueous electrolyte;
   an anode comprising:
      an aluminum current collector; and,
      an antimony (Sb)-based electrochemically active material overlying the aluminum current collector.

2. The battery of claim 1 wherein the non-aqueous electrolyte primarily comprises one or more carbonates selected from the group consisting of ethylene carbonate, propylene carbonate, dimethyl carbonate, diethyl carbonate, and ethyl methyl carbonate, in combination with a dissolved sodium salt selected from a group consisting of sodium hexafluorophosphate ($NaPF_6$), sodium perchlorate ($N_aClO_4$), sodium bis(trifluoromethane)sulfonamide (NaTFSI), sodium aluminate ($NaAlO_2$) and sodium tetrafluoroborate ($NaBF_4$).

3. The battery of claim 1 wherein the non-aqueous electrolyte primarily comprises a polymer host selected from the group consisting of polyvinylidene fluoride (PVDF), poly (vinylidene fluoride-co-hexafluoropropylene)/poly(methyl methacrylate) (PVDF-HFP), polyethylene oxide (PEO), polyacrylonitrile (PAN), poly(methyl methacrylate) (PMMA), or ionic liquids, in combination with a dissolved sodium salt selected from a group consisting of $NaPF_6$, $NaClO_4$, NaTFSI, $NaAlO_2$, and $NaBF_4$.

4. The battery of claim 1 wherein the non-aqueous electrolyte comprises an additive selected from the group consisting of fluorinated cyclic carbonates, fluorinated linear carbonates, and alkaline salts.

5. The battery of claim 1 wherein the cathode primarily comprises an electrochemically active material selected from the group consisting of sodium cobalt oxide ($NaCoO_2$), sodium manganese(IV) oxide ($NaMnO_2$), sodium nickel(II) oxide ($NaNiO_2$), sodium iron(III) phosphate ($NaFePO_4$), manganese(IV) oxide ($MnO_2$), vanadium(V) oxide ($V_2O_5$), molybdenum trioxide ($MoO_3$), Prussian Blue analogues, sulfur, or active organics including electrically conducting polymers and oxocarbon salts.

6. The battery of claim 1 wherein the Sb-based electrochemically active material comprises a material selected from the group consisting of pure antimony, Sb with other metal elements, and Sb with non-metal elements.

7. The battery of claim 6 wherein the Sb-based electrochemically active material comprises a material selected from the group consisting of Sb binary or ternary alloys of sodium, potassium, silicon, tin, germanium, bismuth, selenium, tellurium, thallium, aluminum, gold, cadmium, arsenic, mercury, cesium, gallium, titanium, lead, carbon, sulfur, phosphor, metal oxides including tin oxide, germanium oxide, iron oxide and manganese oxide, or metal sulfides such as tin sulfide, iron sulfide, titanium sulfide, and molybdenum sulfide, and combinations thereof.

8. The battery of claim 1 wherein the aluminum current collector additionally comprises a material selected from the group consisting of magnesium, iron, nickel, titanium, and combinations thereof.

9. The battery of claim 1 wherein the anode further comprises:
   a coating interposed between the aluminum current collector and the Sb-based electrochemically active material, the coating comprising a material selected from a group comprising a non-corrodible metal and a carbonaceous material.

10. The battery of claim 1 wherein the anode further comprises:
    a polymer binder.

11. The battery of claim 1 wherein the anode further comprises:
    a conductive additive selected from the group consisting of carbon black, graphite, graphene, carbon nanotubes (CNTs), and carbon nanofibers (CNFs).

12. The battery of claim 1 wherein the Al current collector has a structure selected from a group consisting of foil, plate, mesh, foam, or grid.

* * * * *